(12) United States Patent
Fiordalis

(10) Patent No.: US 8,152,382 B2
(45) Date of Patent: Apr. 10, 2012

(54) OUTPUT TUBE ASSEMBLY FOR DRIVE AXLE COVERS AND METHOD OF USE

(75) Inventor: Gary W. Fiordalis, Richland, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 658 days.

(21) Appl. No.: 12/321,716

(22) Filed: Jan. 23, 2009

(65) Prior Publication Data

US 2010/0189389 A1    Jul. 29, 2010

(51) Int. Cl.
*F16C 33/66* (2006.01)
*F16H 57/04* (2010.01)
(52) U.S. Cl. .................... 384/473; 475/160
(58) Field of Classification Search .............. 384/462, 384/465, 471, 473, 474; 475/201, 202, 160
See application file for complete search history.

(56) References Cited

U.S. PATENT DOCUMENTS

| | | | |
|---|---|---|---|
| 5,114,248 A * | 5/1992 | Harsdorff | 384/473 |
| 5,312,192 A * | 5/1994 | Shimuzu et al. | 384/474 |
| 5,404,963 A * | 4/1995 | Crepas et al. | 384/473 |
| 7,178,424 B2 * | 2/2007 | Petruska et al. | 475/160 |
| 7,258,641 B2 * | 8/2007 | Green et al. | 475/160 |
| 2003/0032516 A1 | 2/2003 | Gervais, III et al. | |
| 2006/0021463 A1 | 2/2006 | Peterson et al. | |

FOREIGN PATENT DOCUMENTS

JP    10306868    11/1998

* cited by examiner

*Primary Examiner* — Thomas R Hannon
(74) *Attorney, Agent, or Firm* — Marshall & Melhorn LLC

(57) ABSTRACT

An output tube assembly including a substantially cylindrical tube having an inner surface and an outer surface is provided. Also included is at least a set of bearings located on the inner surface of the tube. A slot through the inner surface to the outer surface extending from the inboard end of the cylindrical tube past the set of bearings is also included. A flange, a snap ring, and an end cap may also be provided. A method for lubricating the bearings of the assembly is also provided.

16 Claims, 4 Drawing Sheets

OUTPUT TUBE ASSEMBLY FOR DRIVE AXLE COVERS AND METHOD OF USE

BACKGROUND OF THE INVENTION

An input shaft receives driving torque from the vehicle driveline. For vehicles having forward and rear tandem driven axles, the input shaft then typically transfers driving torque to an inter-axle differential by being drivingly engaged therewith. The inter-axle differential then transfers driving torque to a forward differential and to a rear differential via an output shaft. Both the input shaft and output shaft are preferably rotatably supported by bearings.

Bearings, usually as part of a set of bearings, are preferably supported by another structure. Traditionally, for bearing sets supporting an output shaft, an output tube is utilized to provide support for the bearings. When an output tube is utilized, the bearings are generally disposed within the output tube.

Bearings require lubrication to prevent excessive wear and heat buildup from rapidly occurring. In order to properly lubricate the bearings, the lubricant must pass from one side or face of the bearing to the other. Thus, for bearings contained within an output tube, lubricant must be able to pass through the output tube and it must be allowed to continuously pass from one side of the bearing set to the other.

FIG. 1 shows an output tube known in the art. Traditionally, output tubes are formed in a forging process. A forging process produces an output tube 10 with only one channel 12 for allowing lubricant outside the output tube 10 to lubricate the bearings inside. This configuration prevents the bearings from being properly lubricated. For example, with a single channel 12, lubricant can initially pass from one side of a bearing set to the other. However, with nowhere to go, the initial lubricant blocks additionally lubricant from passing across the bearing set. Furthermore, the lubricant that can not pass then prevents the initial lubricant from returning across the bearing face. Thus a single channel output tube allows lubricant to flow in, but prevents it from escaping and prevents the bearings from being properly lubricated.

Those skilled in the art sought to solve this problem by removing a portion of the output tube 10 to create a second channel 14 to allow lubricant to flow into and out of the tube 10. The second channel 14 was traditionally made by a drilling process after formation of the output tube 10. The second channel 14 thus typically had an elliptical, conical, or circular shape. FIG. 2 depicts an output tube known in the art and produced using a forging and a drilling process. To ensure that the all of the bearing sets in the output tube 10 were properly lubricated, the second channel 14 is typically drilled outboard of outboard-most bearing set.

Creating a second channel allows lubricant to flow through the output tube and pass from one side of all the bearings within the tube to the other. However, a two step process is costly and inefficient. Therefore an object of the present invention is to provide an output tube that allows the bearings contained within it to be properly lubricated and that can be made in a one step process.

BRIEF SUMMARY OF THE INVENTION

The present invention is generally directed to an output tube assembly for a drive axle cover. A method for lubricating at least set of bearings located within the output tube assembly is also provided.

The output tube assembly comprises a substantially cylindrical tube having an inner surface and an outer surface. Each surface has an inboard end portion, an intermediate area, and an outboard end portion. The inner surface inboard end portion, intermediate area, and outboard end portion have a first diameter and a second diameter. Disposed within the intermediate area of the inner surface is at least a set of bearings. A slot is provided through the inner surface to the outer surface. The slot extends from each surface's inboard end portion past the bearing sets in the intermediate area.

The method for lubricating the bearings within the output tube assembly comprises providing a substantially cylindrical tube having an inner surface and an outer surface. Each surface has an inboard end portion, an intermediate area, and an outboard end portion. At least a set of inboard bearings and a set of outboard bearings disposed within the intermediate area of the inner surface is also provided. The method also comprises providing an output shaft extending through the inner surface which is rotatably supported by the bearings. A slot through the inner surface to the outer surface of the cylindrical tube is also provided. The slot extends from the inboard end portion past the set of outboard bearings. The method further comprises circulating lubricant located in an axle cover through the slot so that the lubricant lubricates the output shaft and the bearings. The lubricant is then allowed to return to the axle cover but is prevented from escaping from the outboard end portion of the inner surface by providing a seal. The seal is seated in the inner surface outboard end portion and sealingly engages the output shaft.

BRIEF DESCRIPTION OF THE SEVERAL VIEWS OF THE DRAWING

The above, as well as other advantages of the present invention, will become readily apparent to those skilled in the art from the following detailed description when considered in light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions, or other physical characteristics relating to the embodiments disclosed are not to be considered as limiting, unless the claims expressly state otherwise. Additionally, although the invention will be described in connection with a output tube assembly, it would be understood by one of ordinary skill in the art that the output tube assembly and method for use described herein have applications to other structures used to support bearings or that have bearings contained within.

Figure 1:
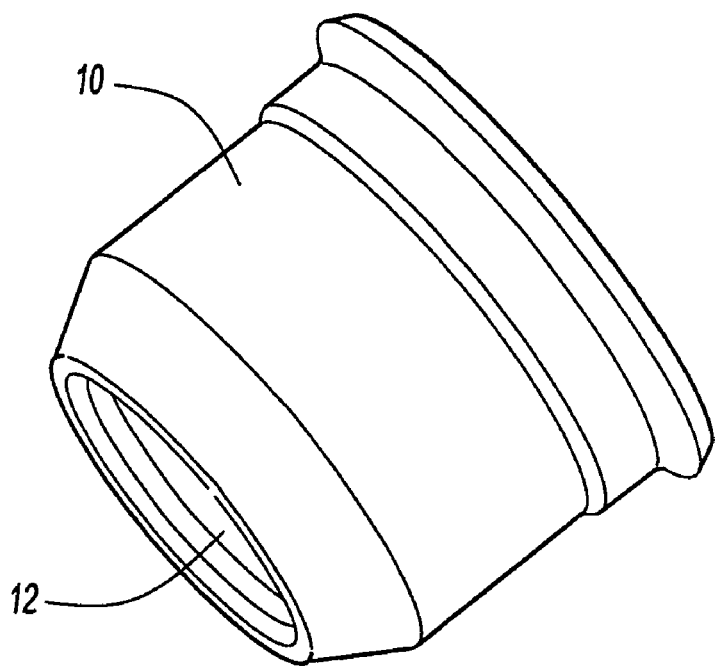
FIG. 1 is a perspective view of an output tube known in the art.
Figure 2:
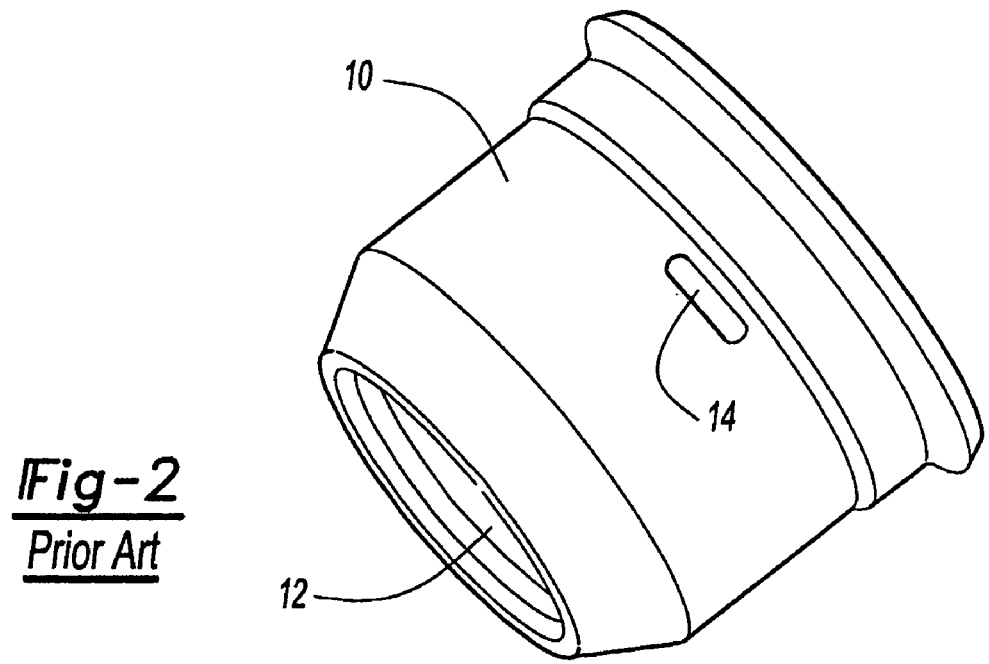
FIG. 2 is a perspective view of an output tube known in the art.
Figure 3:
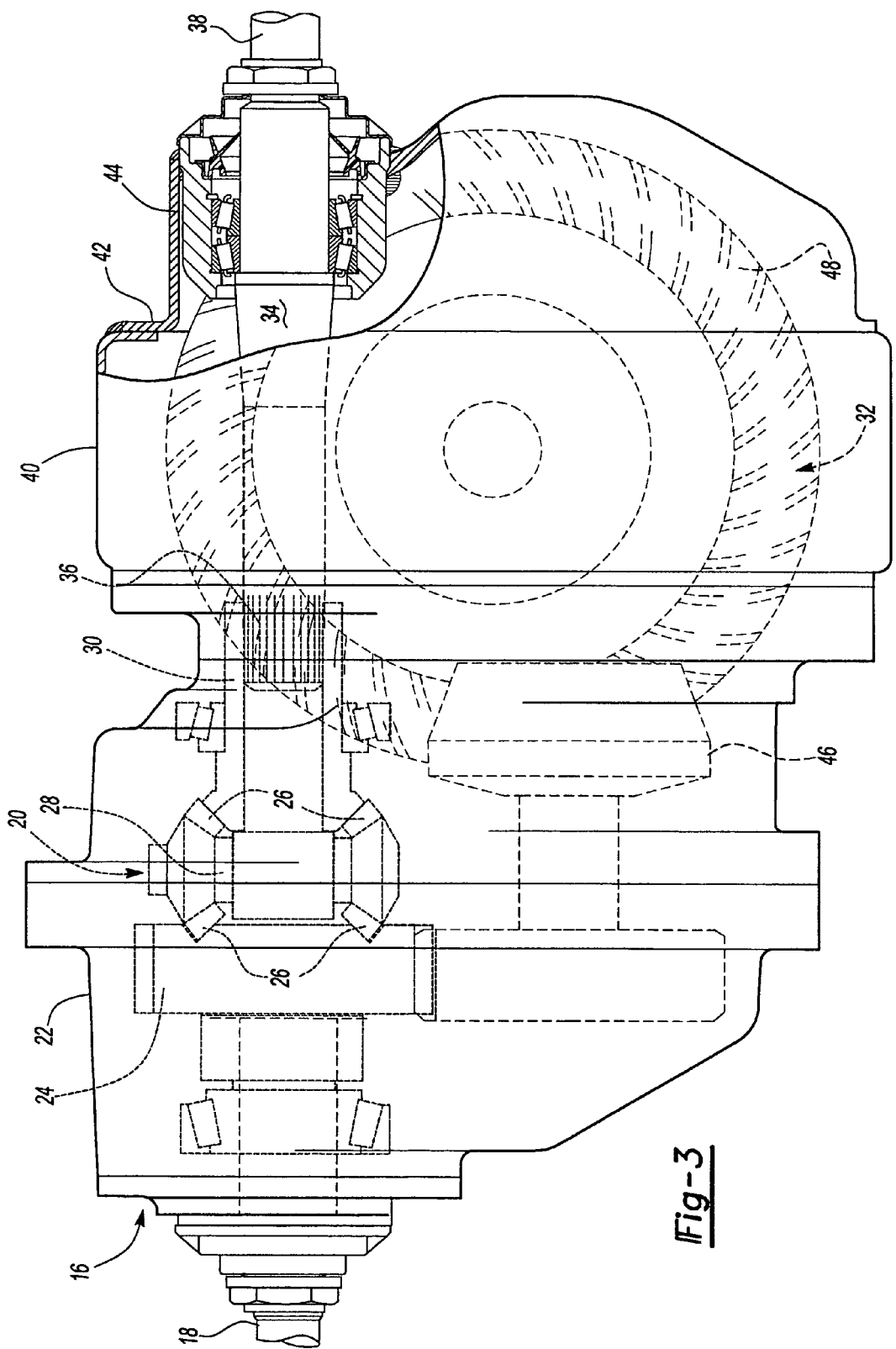
FIG. 3 is a cross-sectional view of a drive axle assembly including an output tube assembly in accordance with the present invention.

FIG. 3 shows a typical drive axle assembly 16 for a vehicle having forward and rear driven axles. A vehicle driveline (not depicted) transmits driving torque to an input shaft 18. The input shaft 18 is provided to transmit power to an inter-axle differential assembly 20 contained within an inter-axle differential housing 22.

A typical inter-axle differential assembly 20 includes a forward side gear 24, pinion gears 26 supported on a spider 28, and a rear side gear 30. The inter-axle differential assembly 20 allows power transmitted from the input shaft 18 to be distributed between a forward differential 32 and a rear differential (not depicted). The forward differential 32 transfers driving torque to the forward axle half shafts (not depicted). An output shaft 34 transfers driving torque from the inter-axle differential assembly 20 to the rear differential (not depicted). The rear differential transfers driving torque to the rear axle half shafts (not depicted).

The output shaft 34 is coupled on a first end portion 36 to the rear side gear 30. On a second end portion 38, the output shaft 34 is coupled to a yoke (not depicted) which engages a drive shaft (not depicted) and ultimately the rear differential. The output shaft 34 thus extends from the inter-axle differential housing 22 and through a forward differential cover 40, a forward axle cover 42, and an output tube assembly 44.

The inter-axle differential housing 22 is connected to the forward differential cover 40. Contained within the forward differential cover 40 is the forward differential 32 which generally comprises a pinion gear 46 and a ring gear 48. The forward differential cover 40 is connected to the forward axle cover 42 which contains the axle half shafts therein. The inter-axle differential housing 22, the forward differential cover 40, and the forward axle cover 42 are filled with lubricant.

The input shaft 18, the inter-axle differential assembly 20, the output shaft 34, the forward differential 46 and the rear differential are each typically supported by at least multiple sets of bearings. Bearings require lubrication to prevent excessive wear and heat buildup from rapidly occurring. In order to be properly lubricated, lubricant must pass from one side or face of a bearing to the other. The present invention is generally directed to an output tube assembly 44 that ensures that the bearings within the output tube can be properly lubricated.

Figure 4:
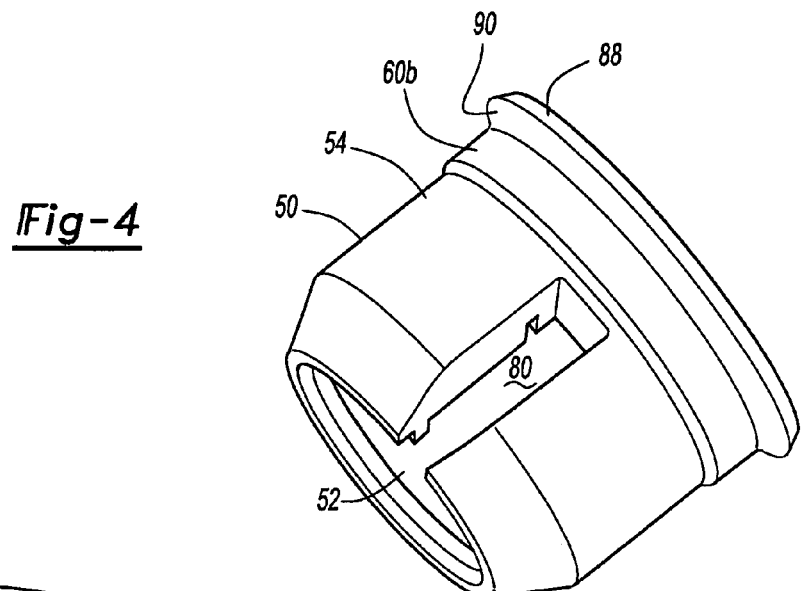
FIG. 4 is a perspective view of the output tube of the present invention.

Referring to FIG. 4, the output tube assembly 44 of the present invention comprises a substantially cylindrical tube 50. The cylindrical tube 50 is generally made from a resilient material which is preferably steel. However, those skilled in the art would understand that other materials may also be used for the cylindrical tube 50. The cylindrical tube 50 has an inner surface 52 and an outer surface 54.

Figure 5:
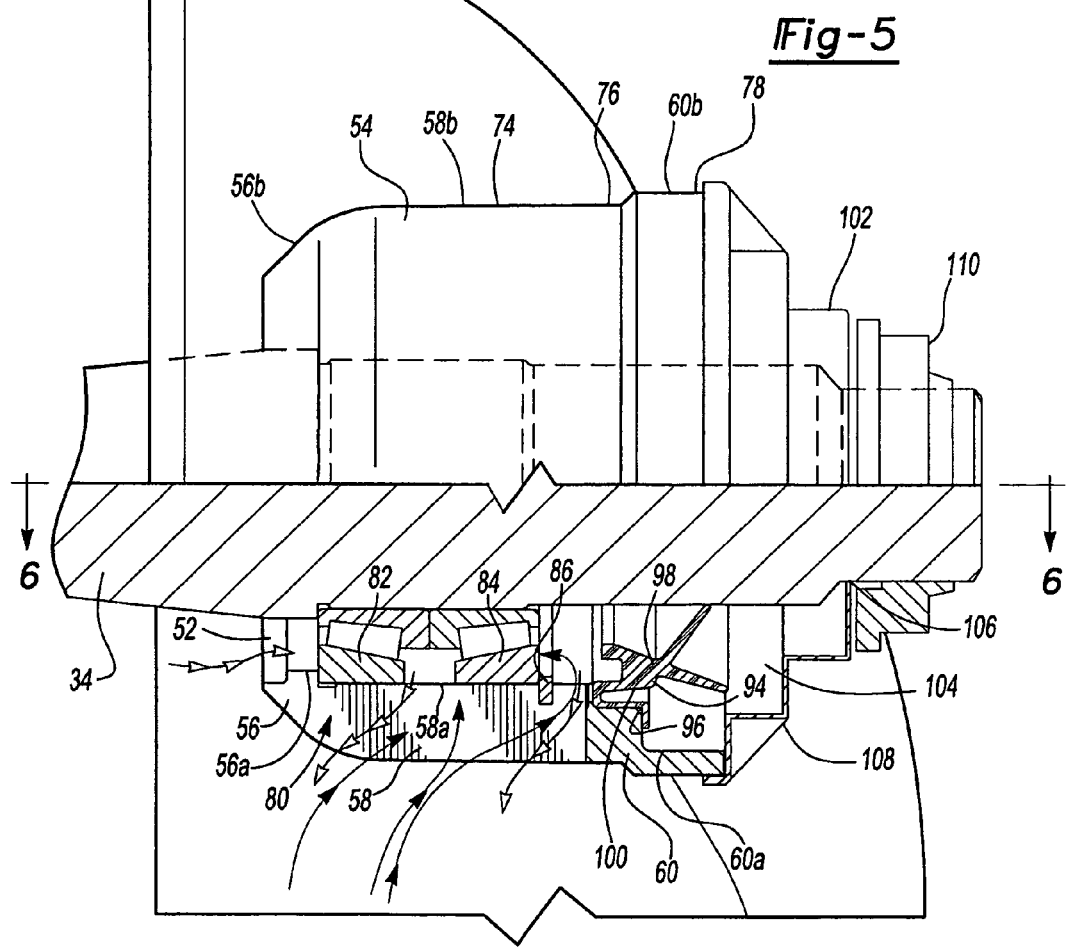
FIG. 5 is a cross-sectional view of the output tube assembly of the present invention.
Figure 6:
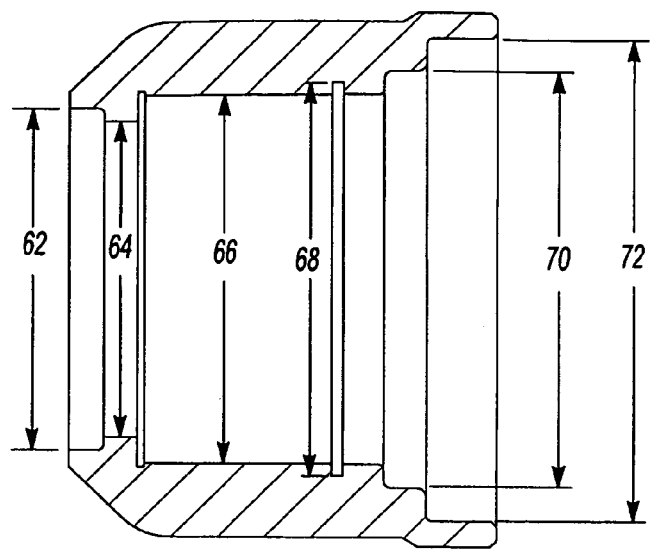
FIG. 6 is a cross-sectional view of the cylindrical tube of the present invention.

Referring now to FIG. 5, the inner surface 52 receives the output shaft 34. The output shaft 34 extends through the inner surface 52. Both the inner surface 52 and the outer surface 54 are comprised of an inboard end portion 56, an intermediate area 58, and an outboard end portion 60. As shown in FIG. 6, the inner surface inboard end portion 56*a*, intermediate area 58*a*, and outboard end portion 60*a* have first and second diameters. In one embodiment, the inner surface inboard end portion first diameter 62 is larger than that of the inner surface inboard end portion second diameter 64. In this embodiment, the first diameter 66 of the inner surface intermediate area is smaller than the inner surface intermediate area second diameter 68 and the inner surface outboard end portion first diameter 70 is also smaller than the inner surface outboard end portion second diameter 72.

Referring back now to FIG. 5, in one embodiment, the outer surface inboard end portion 56*b* is tapered, the outer surface intermediate area 58*b* has a substantially constant diameter 74, and the outer surface outboard end portion 60*b* has a first diameter 76 and at least a second diameter 78. In this embodiment, the outer surface outboard end portion second diameter 78 is larger than the outer surface intermediate area diameter 74.

The output tube assembly 44 of the present invention also comprises a slot 80 in the cylindrical tube 50. The slot 80 goes through the inner surface 52 to the outer surface 54 of the cylindrical tube 50. In one embodiment, the slot 80 extends from the inboard end portion 56 past the bearing sets disposed within the tube 50. In another embodiment, the slot 80 extends from the inboard end portion 56 through the intermediate area 58. The slot 80 can also assume a variety of shapes. For example, the slot 80 could be curvilinear or spherical. As shown in FIG. 6, in one embodiment the slot 80 has a substantially constant width.

Traditionally, an output tube was formed by a forging process. A second process, typically drilling, was then employed to remove a portion of the tube. The cylindrical tube 50 of the present invention can be made in a two step process but is also possible to practice the present invention by utilizing only a casting process to create the cylindrical tube 50.

The output tube assembly 44 of the present invention comprises at least a set of bearings. In one embodiment, the assembly of the present invention comprises two sets of bearings 82, 84. In another embodiment, the bearing sets are comprised of thrust roller bearings. However, those skilled in the art would recognize that other bearing types may also be used in the present invention.

Referring back to FIG. 5, the bearings rotatably support the output shaft 34, thus they are preferably disposed within the inner surface 52 of the cylindrical tube 50. In one embodiment, at least a set of bearings are disposed within the inner surface intermediate area 58*a*. In another embodiment, at least a set of bearings are disposed within the inner surface intermediate area first diameter 66. In another embodiment, at least an inboard set of bearings 82 and an outboard set of bearings 84 are disposed within the inner surface intermediate area first diameter 66.

The output tube assembly 44 of the present invention may also comprise a snap ring 86. Generally, snap rings provide support to the position of components contained within cylindrical structures. In the present invention, a snap ring 86 can be utilized to fixedly position a single 84 or plurality of bearing sets 82, 84. In one embodiment, a snap ring 86 is disposed within the inner surface intermediate area second diameter 68 adjacent to a set of bearings 84. Since the bearings 82, 84 rotatably support the output shaft 34, the snap ring 86 also provides support to the output shaft 34.

Figure 7:
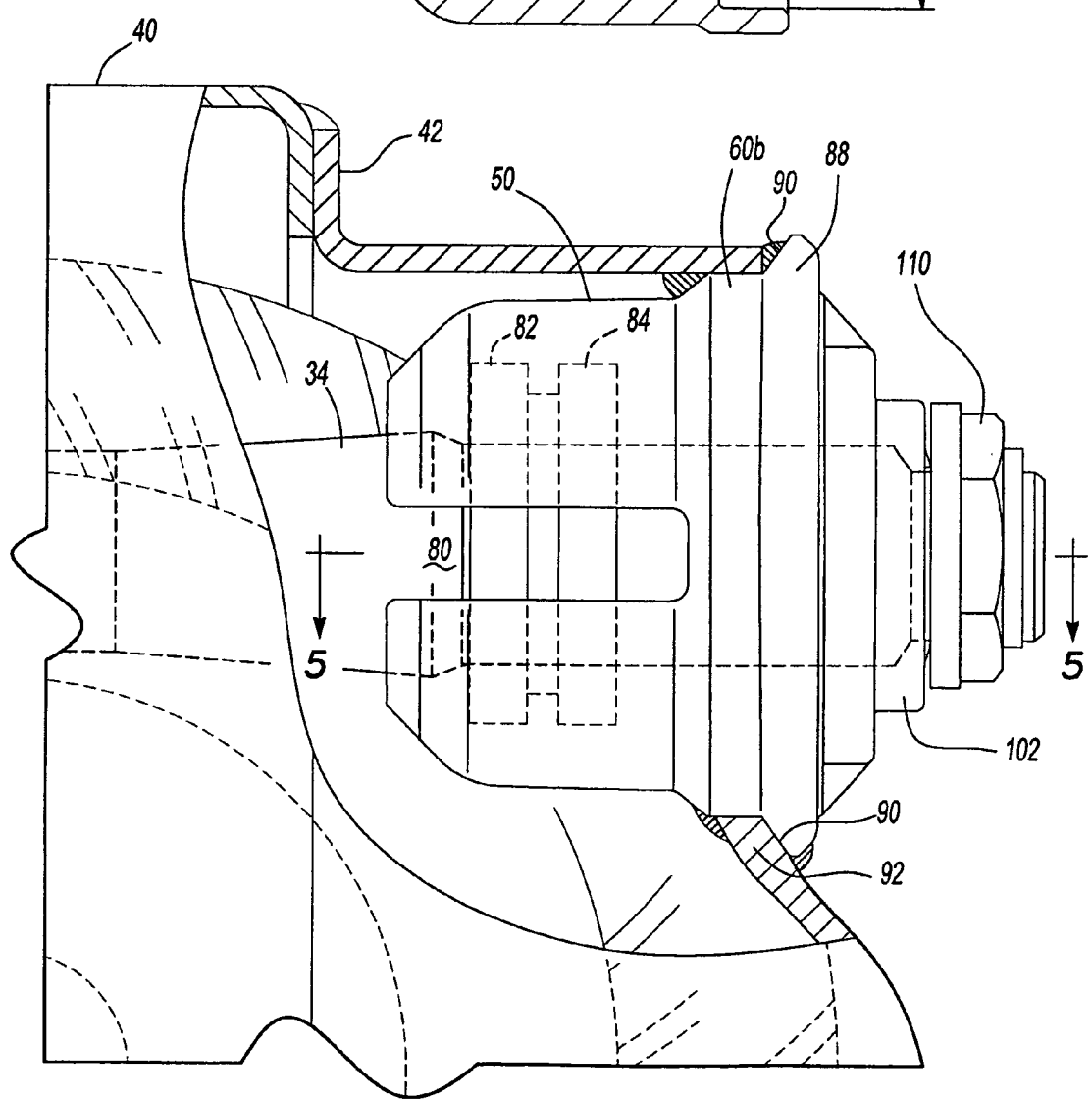
FIG. 7 is a plan view of the output tube assembly of the present invention.

Referring now to FIGS. 4 and 7, the output tube assembly 44 of the present invention may also comprise a flange 88. The flange 88 is rigidly attached to the outer surface outboard end portion 60*b* of the cylindrical tube 50. In one embodiment, the flange 88 is continuous and has a generally circular shape about the outboard end portion 60*b*. However, one skilled in the art would understand that the flange 88 need not be continuous or have a circular shape to be used in the present invention. The flange 88 provides a mating surface 90 for the output tube assembly 44 to be attached to a complimentary portion 92 on the forward axle cover 42. In an embodiment, the flange 88 and the complimentary portion 92 of the forward axle cover 42 are attached via welding. Those skilled in the art would appreciate that the output tube assembly 44 and forward axle cover 42 can also be attached via mechanical fasteners or by other methods known in the art.

Since the inter-axle differential housing 22, the forward differential cover 40, and the forward axle cover 42 are filled with lubricant, the present invention may comprise additional elements that help insure that the lubricant can not escape from the output tube assembly 44.

As shown in FIG. 5, the output tube assembly 44 of the present invention may also comprise a seal 94. The seal 94 is located outboard of the bearing sets 82, 84. In one embodiment, the seal 94 is positioned in the inner surface 52 of the cylindrical tube 50 outboard of the slot 80. In another embodiment, the seal 94 is located in the inner surface outboard end portion 60a. In another embodiment, the seal 94 is seated on a lip 96 between the outboard end portion first diameter 70 and second diameter 72.

Those skilled in the art would appreciate that the seal 94 may have a variety of configurations. The seal 94 of the present invention is configured to prevent lubricant from escaping beyond the inner surface outboard end portion 60a of the cylindrical tube 50. In one embodiment, the seal 94 sealingly engages the output shaft 34 with a first portion 98 and the cylindrical tube inner surface 52 with a second portion 100. In one embodiment the seal 94 may be a rotary shaft seal. In another embodiment, the second portion 100 still sealingly engages the inner surface 52 but the first portion 98 does not contact the output shaft 34. In this embodiment, the seal's first portion 98 sealingly engages another output tube assembly member which in turn is in sealing engagement with the shaft 34 or a bearing set 82, 84.

Additionally, one having ordinary skill in the art would recognize that the seal 94 could be made from a variety of materials. Material selection may primarily be based on sealing performance. Thus, the seal 94 could be composed of an elastomer, polyurethane, nitrile, a combination of these materials or other materials known in the art.

As can be seen in FIGS. 5 and 7, the output tube assembly 44 of the present invention may also comprise an end cap 102. The end cap 102 has an inner portion 104, an opening 106, and an outer portion 108. The end cap inner portion 104 is attached to the cylindrical tube's outer surface outboard portion 60b. In one embodiment, the end cap 102 also provides support to the seal 94 through contact between the end cap's inner portion 104 and the seal's second portion 100. However, one having ordinary skill in the art would recognize that the seal need not be supported by the end cap 102 to practice the present invention. The end cap 102 is concentric with the output shaft 34 and has an opening 106 which the output shaft 34 extends through. In an embodiment, the end cap outer portion 108 may be directly adjacent a nut 110. In this embodiment, the nut 110 fixes the position of the end cap 102.

The present invention also provides a method for lubricating the bearings contained within an output tube assembly 44. The method comprises providing the cylindrical tube 50 with its inner surface 52 and its outer surface 54. Each surface having its inboard end portion 56, its intermediate area 58, and its outboard end portion 60.

The method also comprises providing at least the set of inboard bearings 82 and the set of outboard bearings 84 disposed within the cylindrical tube 50. The bearings 82, 84 may be supported by disposing the snap ring 86 within the cylindrical tube 50. In one embodiment, the bearings 82, 84 are located in the intermediate area between the inboard end portion second diameter 64 and the snap ring 86. In this embodiment, the snap ring 86 may be disposed within the inner surface intermediate area second diameter 68. Regardless of the number of bearing sets, the bearings 82, 84 rotatably support the output shaft 34 and must be lubricated to prevent excessive wear and heat buildup from rapidly occurring.

Thus, the slot 80 is provided to enable fluid communication between the lubricant outside the cylindrical tube 50 and the bearings 82, 84 disposed within. The rotation of one or of several components contained within the forward differential housing 40 and/or the forward axle cover 42 primarily circulates the lubricant into the cylindrical tube 50 via the slot 80 and/or the inner surface inboard end portion 56a. Having both the slot 80 and the open inner surface inboard end portion 56a, ensures that the lubricant can pass through the assembly 44 and lubricate the output shaft 34 and the bearings 82, 84. The lubricant can then return to the forward axle cover 42 through the slot 80 and the inner surface inboard end portion 56a.

The lubricant is prevented from escaping from the inner surface outboard end portion 60a in part by providing the seal 94. The seal 94 is positioned in the cylindrical tube's inner surface outboard end portion 60a. In one embodiment, the seal 94 may be seated on the lip 96 between the outboard end portion's first diameter 70 and second diameter 72. In this embodiment, the seal 94 sealingly engages the output shaft 34. However, due to the forces exerted by the rotation of the output shaft 34, the seal 94 may require additional support. Thus, in one embodiment, the end cap 102 supports the seal 94 and is attached to the cylindrical tube's outer surface outboard end portion 60b.

In accordance with the provisions of the patent statutes, the present invention has been disclosed in what are considered to represent its preferred embodiments. However, it should be noted that the invention can be practiced otherwise than as specifically illustrated and described without departing from its spirit or scope.

What is claimed is:

1. An output tube assembly, comprising:
   a substantially cylindrical tube having an inner surface and an outer surface wherein each surface has an inboard end portion, an intermediate area, and an outboard end portion and wherein said inner surface inboard end portion, intermediate area, and outboard end portion each have a first diameter and a second diameter;
   at least a set of bearings disposed within said intermediate area of said inner surface; and
   a slot through said inner surface to said outer surface, said slot extending from said inboard end portion past said bearings.

2. The assembly according to claim 1, wherein said inner surface inboard end portion first diameter is larger than said inner surface inboard end portion second diameter and said inner surface second diameter is larger than said first diameter for said intermediate area and said outboard end portion.

3. The assembly according to claim 1, wherein said outer surface inboard end portion is tapered, said outer surface intermediate area has a substantially constant diameter, and said outer surface outboard end portion has a diameter that is larger than said substantially constant diameter of said outer surface intermediate area.

4. The assembly according to claim 1, wherein said at least one set of bearings comprises two bearing sets disposed in said first diameter of said inner surface intermediate area and wherein each bearing set is comprises thrust roller bearings.

5. The assembly according to claim 4, further comprising a snap ring disposed in said second diameter of said inner surface intermediate area.

6. The assembly according to claim 1, wherein said slot has a substantially constant width.

7. The assembly according to claim 1, wherein said slot extends from said inboard end portion through said intermediate area.

8. The assembly according to claim 1, further comprising a seal seated in said outboard end portion of said inner surface of said cylindrical tube.

9. The assembly of claim 1, further comprising an end cap attached to said outboard end portion of said outer surface of said cylindrical tube.

10. The assembly of claim 1, further comprising an output shaft extending through said inner surface of said cylindrical tube.

11. The assembly of claim 1, further comprising a flange, wherein said flange has a substantially circular shape and is rigidly attached to said outer surface outboard end portion.

12. An output tube assembly, comprising:
   a substantially cylindrical tube having an inner surface and an outer surface wherein each surface has an inboard end portion, an intermediate area, and an outboard end portion and wherein said inner surface inboard end portion, intermediate area, and outboard end portion each have a first diameter and a second diameter wherein said first diameter is smaller than said second diameter in said intermediate area and said outboard end portion;
   at least a set of inboard bearings and a set of outboard bearings disposed within said first diameter of said intermediate area of said inner surface;
   a snap ring disposed within said second diameter of said intermediate area, said snap ring directly adjacent said set of outboard bearings; and
   a slot through said inner surface to said outer surface having a substantially constant width, said slot extending from said inboard end portion past said snap ring.

13. The assembly of claim 12, further comprising a flange, said flange rigidly attached to said outer surface outboard end portion of said cylindrical tube and an axle cover.

14. A method for lubricating a set of bearings located within an output tube assembly, comprising:
   providing a substantially cylindrical tube having an inner surface and an outer surface wherein each surface has an inboard end portion, an intermediate area, and an outboard end portion;
   providing at least a set of inboard bearings and a set of outboard bearings disposed within said intermediate area of said inner surface;
   providing an output shaft extending through said inner surface and rotatably supported by said bearing sets;
   providing a slot through said inner surface to said outer surface of said cylindrical tube, said slot extending from said inboard end portion past said set of outboard bearings;
   circulating lubricant located in an axle cover through said slot by rotational movement so that said lubricant lubricates said output shaft and said bearing sets;
   allowing said lubricant to return to said axle cover; and
   preventing said lubricant from escaping from said outboard end portion of said inner surface by providing a seal, said seal being seated in said inner surface outboard end portion and sealingly engaging said output shaft.

15. The method of claim 14, further comprising supporting said seal with an end cap, wherein said end cap is attached to said outboard end portion of said outer surface of said cylindrical tube.

16. The method of claim 15, further comprising supporting said output shaft with a snap ring disposed within the second diameter of said inner surface intermediate area.

* * * * *

UNITED STATES PATENT AND TRADEMARK OFFICE
CERTIFICATE OF CORRECTION

PATENT NO. : 8,152,382 B2  Page 1 of 1
APPLICATION NO. : 12/321716
DATED : April 10, 2012
INVENTOR(S) : Gary W. Fiordalis It is certified that error appears in the above-identified patent and that said Letters Patent is hereby corrected as shown below:

Column 6, line 64: after the word set, please delete the word "is".

Signed and Sealed this
Twenty-second Day of May, 2012

David J. Kappos
*Director of the United States Patent and Trademark Office*